UNITED STATES PATENT OFFICE.

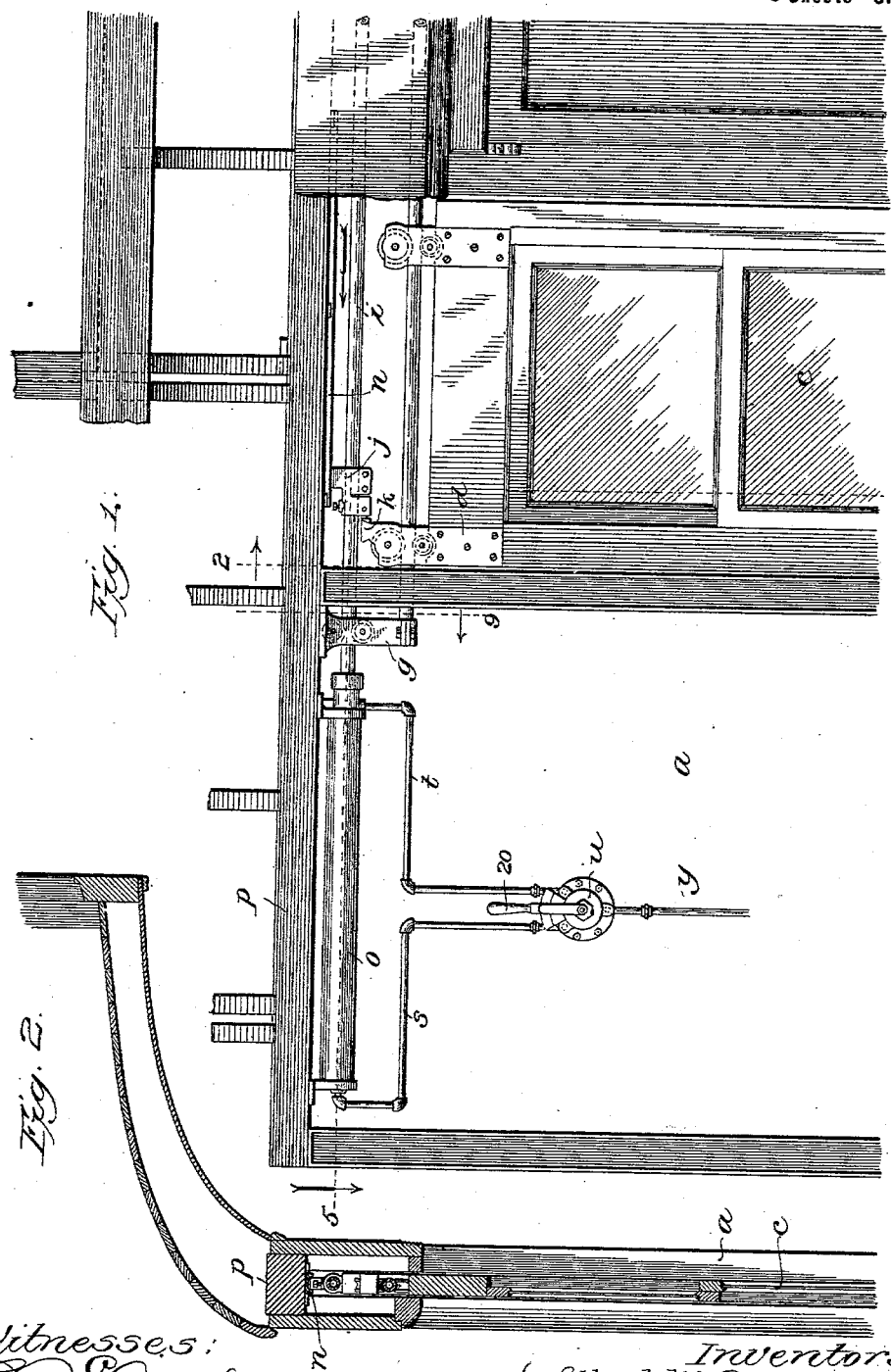

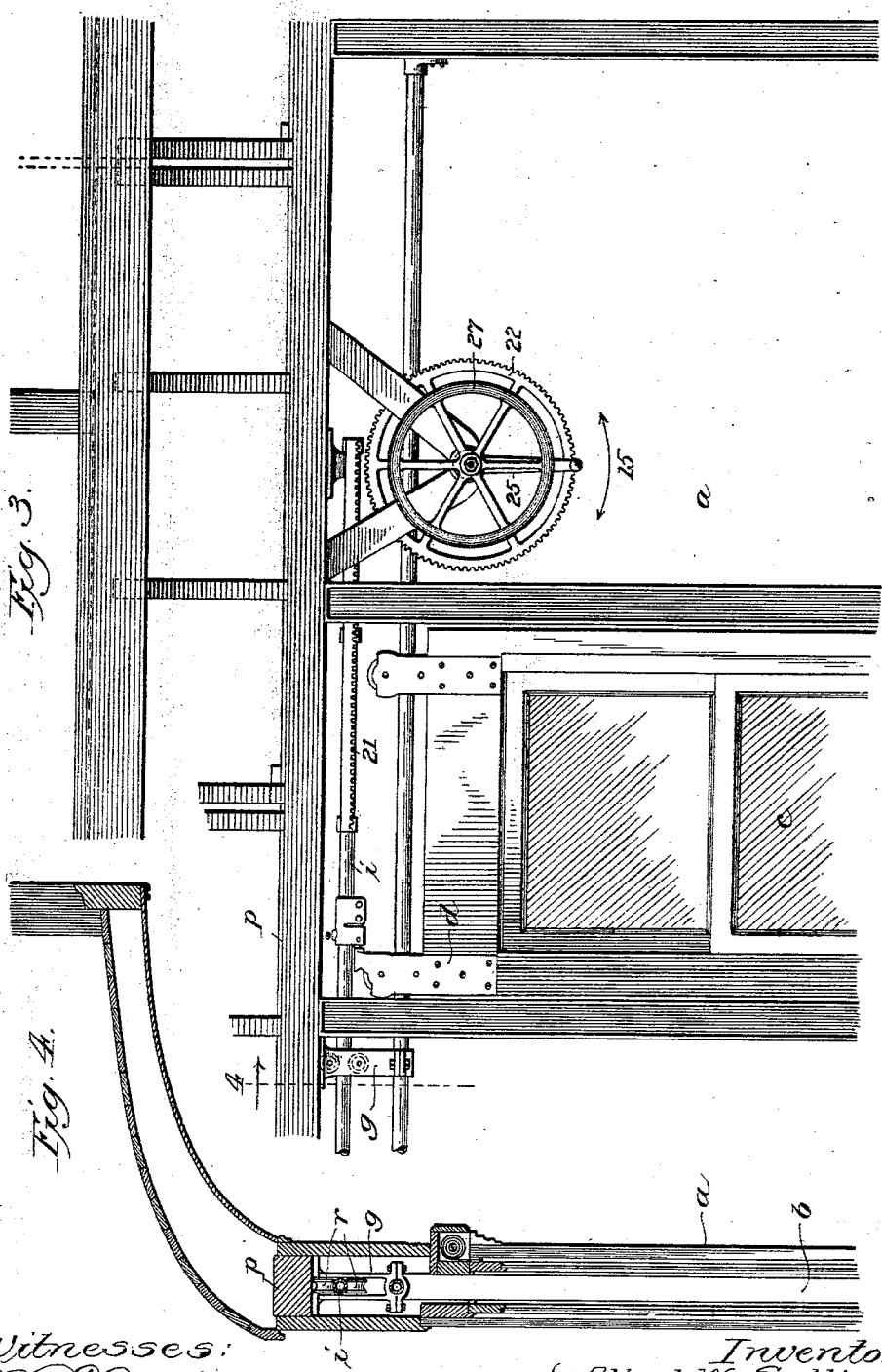

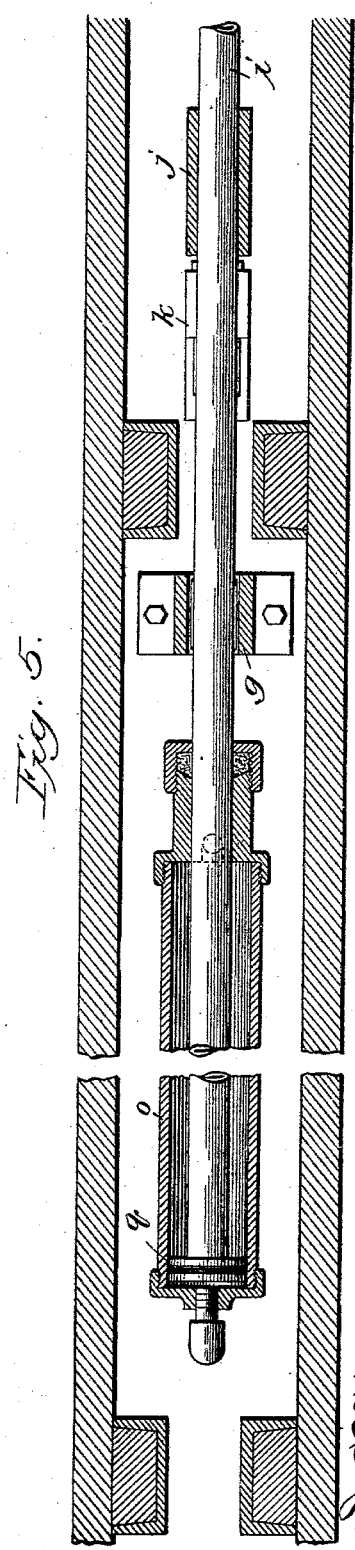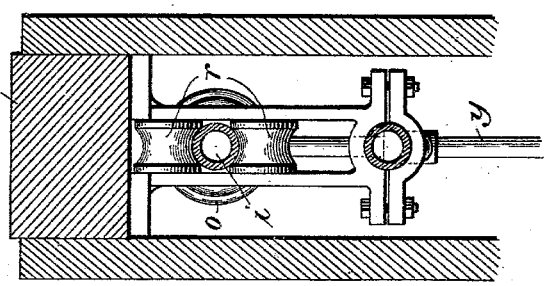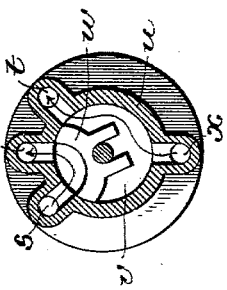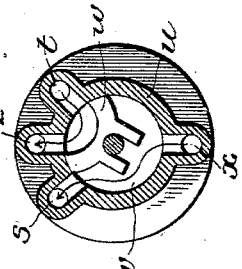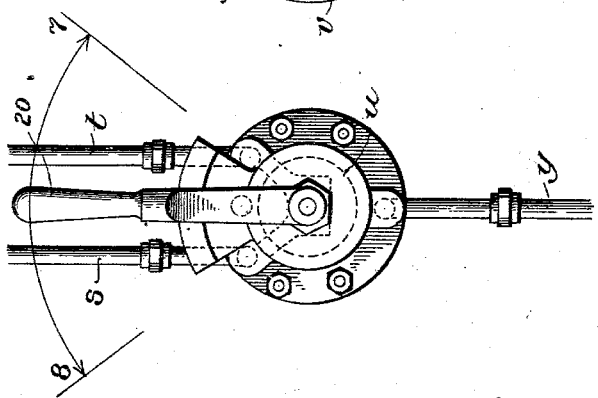

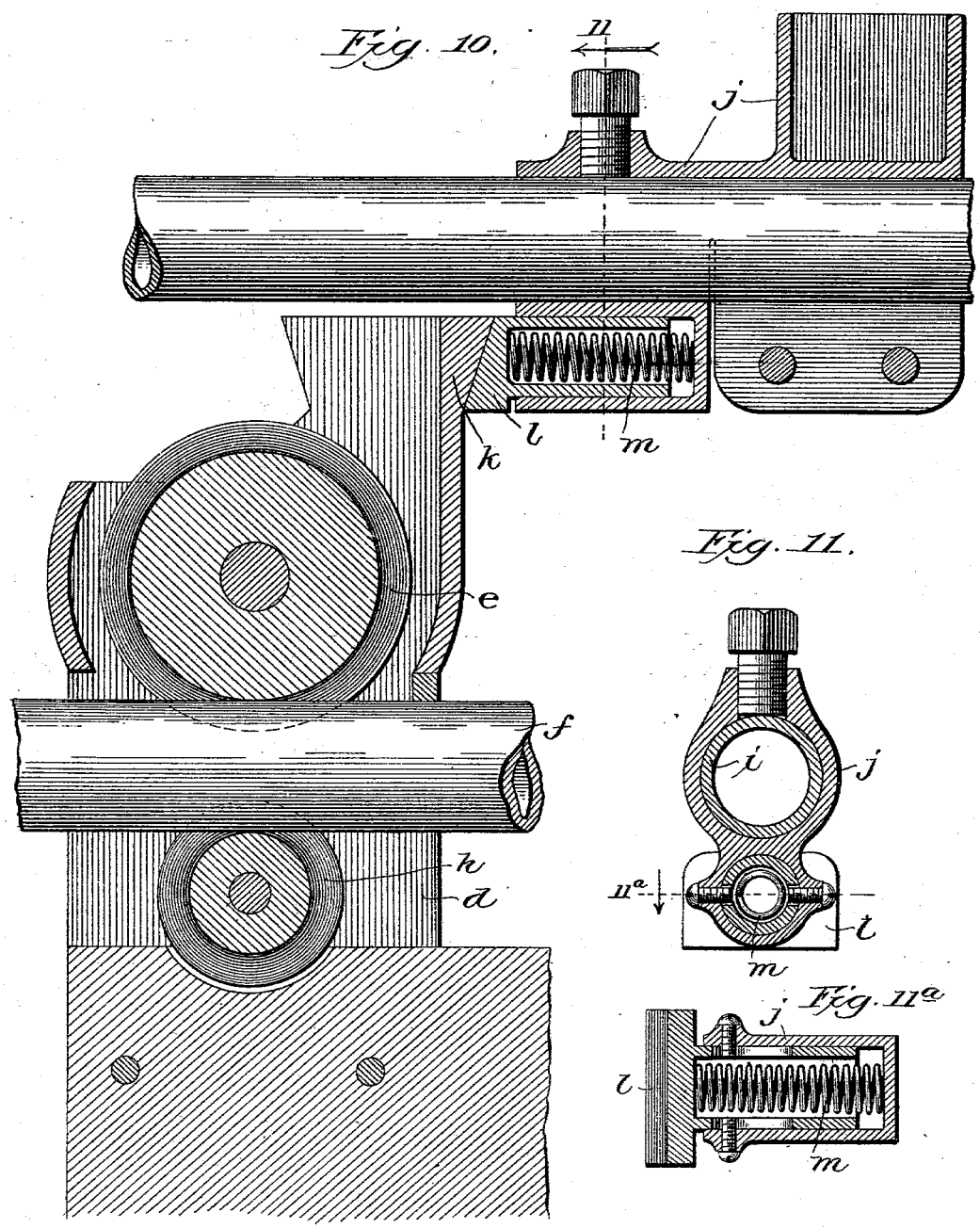

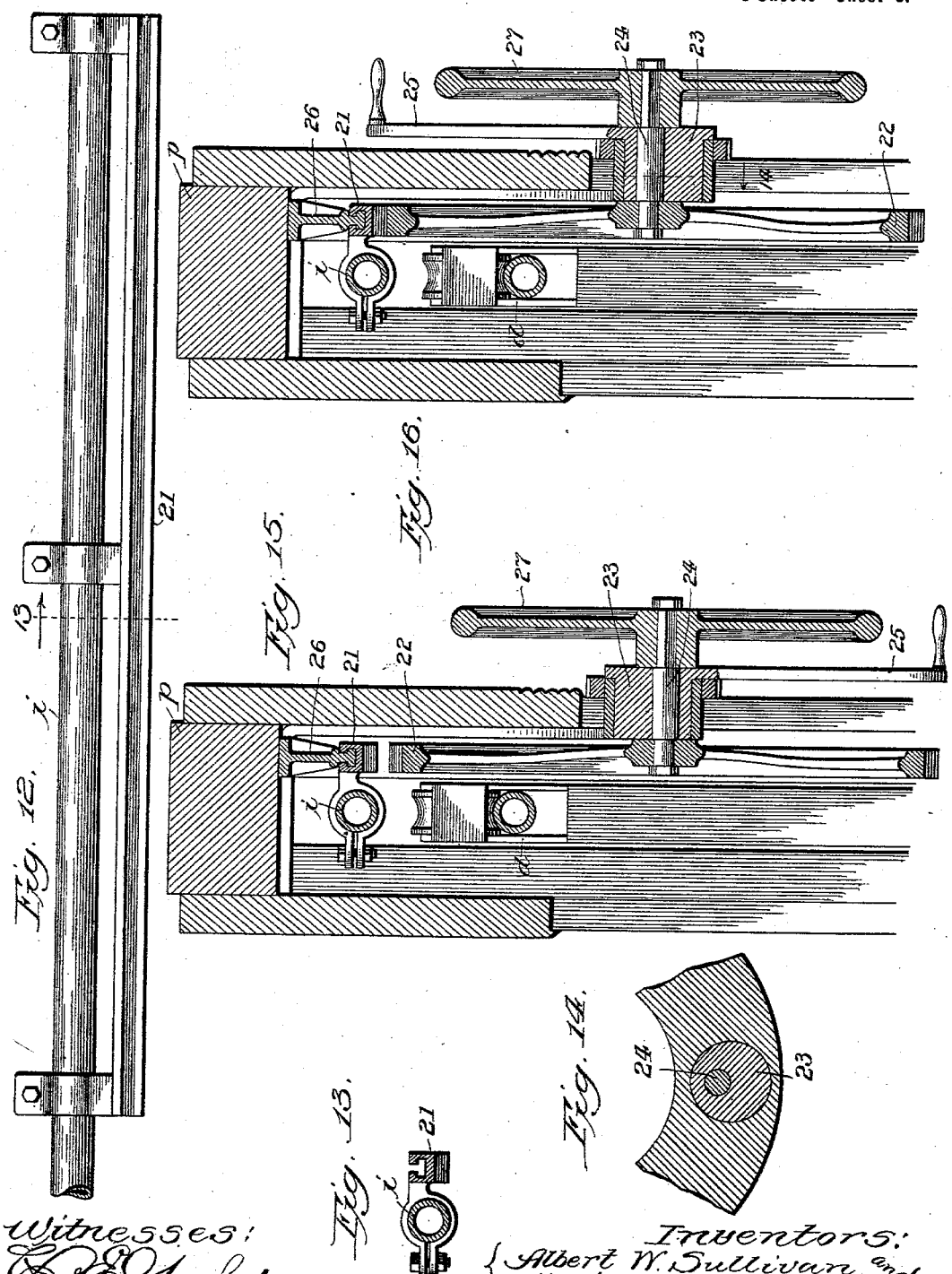

ALBERT W. SULLIVAN AND WILLIAM RENSHAW, OF CHICAGO, ILLINOIS.

PNEUMATICALLY-ACTUATED CAR-DOOR.

SPECIFICATION forming part of Letters Patent No. 716,783, dated December 23, 1902.

Application filed April 13, 1901. Serial No. 55,638. (No model.)

*To all whom it may concern:*

Be it known that we, ALBERT W. SULLIVAN and WILLIAM RENSHAW, citizens of the United States, residing at Chicago, in the county of Cook and State of Illinois, have invented certain new and useful Improvements in Pneumatically-Actuated Car-Doors, of which the following is a specification.

This invention relates to an improvement in car-doors which are arranged to be closed by mechanism acting under the influence of compressed air or other motive fluid, and particularly to sliding car-doors and the pneumatically-actuated mechanism by which the closing or opening thereof is controlled, all of which will more fully hereinafter appear.

The principal object of the invention is to provide a railway-car having sliding doors with pneumatically-actuated mechanisms by which the opening and closing of the door is controlled.

A further object of the invention is to provide doors of the class described with a pneumatically-actuated piston that closes such doors and permits them to be opened.

Further objects of the invention will appear from an examination of the drawings and the following description and claims.

The invention consists principally in the combination of a car provided with a plurality of side doors, an operating-cylinder connected with a source of fluid-pressure, a reciprocating piston therein arranged to be operated by the compressed air or other fluid pressure, and an operating-rod engaged by such piston and engaging with such doors, by which the opening and closing thereof is controlled.

The invention consists, further, in the combination of a car provided with one or more sliding doors, an operating-cylinder connected with a source of fluid-pressure, a reciprocating piston therein provided with a stem extending out through one of the ends thereof and engaging the door or doors to hold them closed when in one (its initial) position, permit them to open when in the other position, and close them when returning to its initial position.

The invention consists, finally, in the features, combinations, and details of construction hereinafter described and claimed.

In the accompanying drawings, Figure 1 is an elevation of a portion of a car containing a sliding door and fitted with our improvements; Fig. 2, a sectional detail taken on line 2 of Fig. 1 looking in the direction of the arrow; Fig. 3, an elevation of a portion of the other end of the same car from that shown in Fig. 1 and showing a second sliding door fitted with opening and closing mechanisms in accordance with these improvements; Fig. 4, a sectional detail taken on line 4 of Fig. 3 looking in the direction of the arrow; Fig. 5, an enlarged longitudinal section taken on line 5 of Fig. 1 looking in the direction of the arrow; Fig. 6, an enlarged elevation of the controlling-valve and attached mechanism; Figs. 7 and 8, sectional views of the controlling-valve, showing the valve proper in two positions, as hereinafter more fully set forth; Fig. 9, an enlarged sectional view taken on line 9 of Fig. 1; Fig. 10, an enlarged sectional detail of the door-hanger, its supporting-track, and operating mechanism; Fig. 11, a cross-sectional view taken on the line 11 of Fig. 10 looking in the direction of the arrow. Fig. 11$^a$ is a sectional view on the line 11$^a$ of Fig. 11; Fig. 12, an enlarged view of one end of the piston-rod looking at it from above and showing its connection with the operating-rack; Fig. 13, a cross-sectional view taken on line 13 of Fig. 12; Fig. 14, a sectional detail taken on line 14 of Fig. 16; and Figs. 15 and 16 enlarged sectional views taken on line 15 of Fig. 3, showing the operating rack and gear in and out of engagement.

In the art to which this invention relates it is highly desirable to provide a car with doors, preferably sliding, which may be arranged at the sides or ends thereof with mechanism which will close them and keep them closed until such time as the trainman desires to open them, and which mechanism may be operated entirely by energy stored within the car—for instance, compressed air—and in case of emergency manually by the trainman. To accomplish this end, therefore, is the principal object of our invention.

In illustrating and describing our improvements we have only illustrated so much of a car as is old, taken in connection with what we consider to be new, as will properly disclose the invention to others, leaving out of consideration other and well-known parts, which, if described and illustrated herein, would only tend to prolixity, confusion, and ambiguity. We have also shown and described the invention in connection with a car having sliding doors arranged to slide into and out of a space in the wall of the car. It will be understood, however, that we do not desire to be limited to such construction or arrangement any more than is pointed out in the claims at the end of this specification.

In constructing and fitting a car with our improvements a car is provided having side walls $a$ at one side thereof, which are made hollow, or, in other words, are made double, so as to provide an intermediate central space $b$, into which the door $c$ may slide. In order to provide means by which the door may be supported or hung and slid into and out of the side walls of the car, each door is provided with door-hangers $d$, having trolley-wheels $e$, arranged to run upon sectional tubular tracks $f$, which are supported upon or in clamping-hangers $g$. These door-hangers are further provided with idler-pulleys $h$, which assist in holding the door-hangers in operative position. In use it is preferable to use a car having a plurality of sliding doors arranged on one side of the car, and in such arrangement we prefer to extend the track $f$, above referred to, in sections from one end of the car to the other, as shown in Figs. 1 and 3, such sections extending from one to the next hanger, which is adjacent to the next door.

In the case of a car constructed as above suggested—that is, with a plurality of sliding doors on one side—it is desirable to provide means by which the trainman or employees may allow one or more of the doors to be opened separately, for the reason that if all of the doors had to be opened at every stop, say, to let off but one or two passengers it would in inclement weather be very disagreeable and dangerous for the other occupants of the car. It is therefore desirable that each door may be opened independently of the rest, so that only those necessary for the discharge of passengers need be opened. It is also desirable to provide means by which all of the doors that are opened or partially opened may be closed at one and the same operation and kept closed during such time as is desirable.

In order to obtain the result above outlined, an operating or piston rod $i$ is provided, arranged lengthwise of the cars and over the door-hangers and in the space between the double walls at the door side of the car. This operating-rod is arranged to be moved in one direction and to close and keep closed all the doors of the car and in the other direction to permit each or all of them to be opened. This operating-rod is preferably made in one continuous piece, though it may be made in several sections joined together, and is provided with a number of collets $j$, arranged to engage a projection $k$ on one of the door-hangers of each of the doors in such manner as to close the door while the rod is being moved in the direction indicated by the arrow in Fig. 1 and keep it closed. It will be seen from an inspection of the drawings that when the operating-rod is moved in an opposite direction—that is, to the right, as shown in Figs. 1 and 3—the collets on the operating-rod are moved away from contact with the door-hangers and such door or doors may be opened one or all at the same time by the manual exertion of the passengers or trainman; but all of the doors are kept closed so long as the operating-rod is kept in the position shown. It will further be seen from an examination of the drawings that no matter how many doors are opened or partially opened these collets will close all of such doors on their return to what we term the "initial" or "closed" position.

It is desirable to provide a cushion portion on such collet where it engages the door-hanger projection, so as to hold them tightly closed and prevent rattling. In order to accomplish this result, the collet is provided with a pin $l$ and a helical spring $m$, inserted between such pin and collet, as shown in Fig. 10. To prevent the turning of the tubular operating-rod, the upper portion of the collet engages a grooved track $n$, as shown in Figs. 1 and 2. It is also desirable to provide two means for moving this operating-rod, first, a means which will practically dispense with the manual exertions of the trainman and which consists, preferably, of a pneumatically-actuated mechanism, and, second, means which may be operated when the car is not supplied with compressed air and which depends entirely on the manual exertions of the trainman.

Describing the first method, the car is provided with what we term a "fluid-pressure" cylinder $o$, which is arranged at or near the roof of the car and attached to the side of the plate $p$ above the door and inside the space formed by the side wall, as shown particularly in Figs. 1 and 5. This operating or fluid-pressure cylinder has a movable piston $q$ arranged therein, as shown particularly in Fig. 5, secured to the operating or piston rod $i$, above referred to, and which slides or moves upon guiding-pulleys $r$, secured in the supporting-hangers $g$, as shown in Fig. 9, so that as the air under pressure enters the operating-cylinder through the inlet-pipe $s$ at the left end the piston is moved toward the right, moving the operating-rod in the same direction and releasing the door-hangers, so that one or all of the doors may be opened. When the pressure is shut off from the inlet-pipe $s$ and permitted to enter the operating-cylinder through the pipe $t$, connecting with the other end of the cylinder, the piston, with its rod, is moved backward or toward the left, carrying the operating-rod and acting to close each door which is open or partially open and hold such doors closed as long as air under pressure remains in such side of the cylinder.

To control the inlet and exhaust of fluid under pressure to and from the operating-cylinder, a controlling-valve casing $u$ is provided, having a chamber $v$, in which is vibratingly mounted a valve $w$. The casing is provided with an inlet-opening $x$, which is connected with a source of fluid-pressure supply, preferably an auxiliary reservoir, by means of a supply-pipe $y$, and has three outlets, two of them connecting with the service-pipes $s$ and $t$ and the other with an exhaust-pipe $z$. This valve is provided with a stem having a handle 20, which when moved to the position shown by line 7 in Fig. 6 carries the valve to the position shown in Fig. 7, so that fluid under pressure passes from the supply-pipe through the valve-chamber out through the pipe $s$ into the operating-cylinder at the left-hand side thereof, moving the operating-rod so as to permit the door to be opened.

When the valve-handle is moved to the position indicated by line 8 in Fig. 6, the valve is moved to the position shown in Fig. 8, carries the valve to position, so that fluid under pressure passes through the valve-chamber, and thence through pipe $t$ to the right end of the operating-cylinder to move the piston, and thereby the operating-rod, to the left and close the doors, while the fluid-pressure to the left of the piston in the operating-cylinder passes back through pipe $s$ and out through the exhaust $z$, as shown in Fig. 8. When the parts are in the position shown in full lines in Fig. 6, with the handle occupying the position shown therein, the valve is in such relation that the supply and exhaust to and from the operating-cylinder is shut off, and the piston, with its operating-rod, held in any desired position, either to hold the doors locked in closed position or in a partially or entirely opened condition, according to the location of the piston in the operating-cylinder.

At times it may be desirable or necessary when the car is disconnected from a source of fluid under pressure, or if for any reason it should fail, to provide means by which the manual exertions of the trainman may be used to permit the opening and closing of the doors, as above suggested. To accomplish this result, a rack 21 is provided and secured to the operating-rod, as shown in Figs. 12 and 13. This rack is provided with gear-teeth arranged to be engaged with a spur-pinion 22, which is mounted in an eccentric manner in a rotatable sleeve 23 by means of a stub-shaft 24. The sleeve may be rotated by means of a hand-lever 25 and the spur-gear thrown into or out of engagement with the rack, as shown in Figs. 15 and 16. To furnish a brace for the rack, it is grooved in a T-shaped manner and a bracket 26, with a T-shaped head, engaged therewith, all of which acts to hold the rack to its work and permits of its backward and forward movements. The stub-shaft is provided with a hand-wheel 27, by which the gear-wheel may be rotated. When the supply of fluid under pressure is exhausted, it will be seen that this hand-wheel 27 may be rotated in one direction—like the movement of the hands of a clock—to move the operating-rod to the right and permit one or more of the doors to be opened, while a rotation in the opposite direction will move the operating-rod to the left and close each and all of the doors that are opened or partially opened.

As shown particularly in Figs. 4 and 5, it will be seen that all of the piping and mechanisms are arranged in the space between the double walls at the side of the car, so as not only to screen them from view, but to protect them from dust and injury. The idler-pulley in both of the hangers—the door and supporting-hangers—are provided with ball-bearings (not shown) to minimize the frictional resistance and do away with the slotting of the door-hangers.

We claim—

1. In combination with a sliding door, means for actuating the same including an abutment on the door, a reciprocatory member, a collet carried by said member and adapted to contact with the abutment on the door, a guide supported by the framework of the door and engaging said collet, and means for shifting the reciprocatory member, substantially as described.

2. In combination with a door, a rod for slidably supporting the door, a supporting-bracket $g$ for said rod, guide-rollers supported by said bracket, and means for actuating the door comprising an abutment thereon, a longitudinally-shiftable rod movable between said guide-rollers, and a collet carried by the rod and arranged to contact with the abutment on the door, substantially as described.

3. In a car, the combination of a plurality of sliding doors, an operating-rod arranged to engage one end portion of the doors, a fluid-pressure cylinder, a reciprocating piston in said cylinder carried by one end of the operating-rod, and gear mechanism associated with the other end of said rod; substantially as described.

4. In a car, the combination of a plurality of sliding doors, an operating-rod arranged to engage one end portion of the doors, actuating instrumentalities associated with one end of said rod, and auxiliary actuating means at the other end of said rod normally out of engagement therewith; substantially as described.

5. In a car of the class described, the combination of a plurality of sliding doors, door-hangers provided with trolley-wheels for suspending such doors in position, a tubular track upon which such trolley-wheels move, a tubular operating-rod provided with cushioning-collars engaging the door-hangers to move them in one direction, a fluid-pressure cylinder connected at each end with a source of fluid-pressure, a valve to control the inlet and exhaust of fluid under pressure to and from each end of the cylinder, a reciprocating piston in the cylinder connected with the operating-rod to move it in either direction, supporting-hangers for supporting the track, and idler-pulleys in the supporting-hangers to movably support the tubular operating-rod, substantially as described.

6. In a car of the class described, the combination of a plurality of sliding doors, track-supporting hangers, door-hangers provided with trolley-wheels for suspending the doors, a track supported by the track-hangers, idler-wheels in the track-supporting hangers, a tubular operating-rod movably mounted on the idler-wheels of the track-hangers and engaging the sliding doors, a fluid-pressure cylinder provided with a reciprocating piston connected with the operating-rod to move the same, a grooved gear-rack on the other end of the operating-rod, a supporting-bracket provided with a T-shaped head engaging the groove of the rack, a spur-gear meshing with the rack, and means for throwing the gear into and out of mesh with the rack, substantially as described.

7. In a car, the combination of a plurality of sliding doors, an operating-rod adapted to engage and close said doors simultaneously and hold them in closed position, a fluid-pressure cylinder, and a reciprocating piston in said cylinder carried by the end of the operating-rod to operate the same, substantially as described.

8. In a car the combination with a plurality of sliding doors, an operating-rod associated with said doors, instrumentalities associated with said rod for normally actuating the same, and auxiliary actuating means for said rod comprising a rack carried thereby, a pinion adapted to engage said rack to shift the rod, and means for throwing said pinion into and out of engagement with the rack; substantially as described.

9. In a car, the combination with a plurality of sliding doors, an operating-rod for said doors, normal actuating means associated with said rod, and auxiliary actuating means also associated with the rod and held normally inactive relative thereto; substantially as described.

10. In combination with a sliding door, means for actuating the same comprising a reciprocatory member adapted to be moved in one direction independently of the door, a collet carried by said member, and a spring-pressed pin carried by the collet and projecting from the forward end thereof to contact with the door to operate the same when the reciprocatory member is moved in an opposite direction; substantially as described.

11. In combination with a sliding door provided with an abutment, means for actuating the same comprising a reciprocatory member adapted to be moved in one direction independently of the door, a collet carried by said member, and a spring-pressed pin between said collet and the abutment on the door; substantially as described.

ALBERT W. SULLIVAN.
WILLIAM RENSHAW.

Witnesses:
THOMAS F. SHERIDAN,
HARRY IRWIN CROMER.